April 11, 1961  W. T. BEAN, JR  2,979,680
PRESSURE RESPONSIVE DEVICES
Filed Nov. 19, 1959

INVENTOR.
BY William T. Bean, Jr.
Thomas G. Davenport
ATTORNEY

United States Patent Office 2,979,680
Patented Apr. 11, 1961

2,979,680

PRESSURE RESPONSIVE DEVICES

William T. Bean, Jr., 19556 Bretton Drive, Detroit, Mich.

Filed Nov. 19, 1959, Ser. No. 854,063

5 Claims. (Cl. 338—5)

This invention pertains to devices for the measurement of fluid pressures and more particularly to a pressure load cell and a spring element therefor.

A load cell is a device comprising a spring element which is deformed, strained, in proportion to a load, and a strain gauge associated with the spring element to produce an output related to strain thereof, and hence, related to the applied load.

Load cells for the measurement of pressures commonly comprise a clamped plate or diaphragm spring element, with the pressure to be measured applied against a lateral surface thereof. For measurements of the difference between two pressures, the loads may be applied to opposite lateral surfaces of the spring element.

As used herein, a diaphragm implies a sheet of material having a thickness sufficiently small, in relation to its lateral dimensions, to be deformed under a range of pressure loads as a spheroidal shell, stressed uniformly in tension over normal cross-sectional areas, as a sheet having no neutral surface. Diaphragm is to be distinguished from plate in that the latter as a spring element deforms so as to have a neutral surface dividing each normal cross-section into a portion stressed in tension at the convex side of the neutral surface and a portion stressed in compression at the concave side of the neutral surface. It should be noted also, that beam is distinguished from plate, though a beam has stress distributions along longitudinal normal cross sections similar to those of a plate, in that a beam exhibits no significant lateral bending.

The optimum load cell should exhibit a high ratio of gauged-strain to applied load; and a uniform, reproducible relationship, between gauged-strain and applied load.

As employed in conventional pressure cells, thin diaphragms yield high ratios of gauged-strain to applied load, but at the expense of linearity. Conversely, a thick diaphragm or plate spring element yields reduced output distortion, but only at the expense of lowered gauged-strain levels. Most prior pressure cell spring element designs have represented a compromise accepting less than optimum gauged-strain magnitudes and less than optimum linearity and reproducibility.

Attempted solutions of this problem have resulted in complex designs having additional elements, whereby the dual functions of a spring element—to receive an applied load, to exhibit an area strained in proportion to the applied load—are performed by separate load cell parts. An advantage of the latter expedient is that the area of the gauged strains may be isolated from the high or variable temperatures of the loading fluid. However, aside from obvious complexity and expense, such designs are unsatisfactory due to hysteresis effects upon reproducibility and uniformity of load cell output.

Therefore, it is an object of this invention to provide a pressure responsive device yielding improved gauged-strain linearity and increased gauged-strain magnitude for a given range of applied loads.

Another object is to provide a pressure load cell having a minimum number of components, including an integral spring element exhibiting optimum load-strain properties, which components are easily and economically produced by simple machining operations.

A more specific object is to provide an inexpensive efficient pressure load cell having a compound integral spring element which exhibits, for a given range of applied loads, the optimum gauged-strain levels of a diaphragm, the optimum gauged-strain linearity and reproducibility of a simple plate, and which, in addition, allows for isolation of gauged-strain areas from environmental temperature effects.

In fulfilling the aforesaid objectives, this invention in a preferred form, is embodied in a pressure responsive device, comprising, integrally, a diaphragm applied-load receiving means, a beam gauged-strain producing means oriented symmetrically within the area of the diaphragm, means clamping the diaphragm about its periphery and means fixing the ends of the beam. The diaphragm clamping means and the beam fixing means preferably comprise a hollow cylindrical load cell housing portion formed integrally with the spring element. The lateral beam surface portions displaced from the diaphragm are the loci of the preferred gauged-strain areas.

The features of this invention believed to be novel are pointed out with particularity in the appended claims. However, for a better understanding, together with further objects and advantages thereof, reference should be had to the following description taken in conjunction with the accompanying drawing, wherein:

Figure 1:
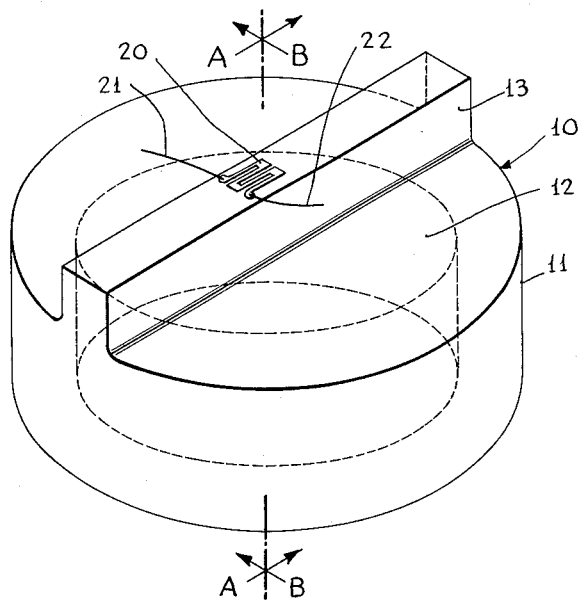
Fig. 1 is a perspective view of a preferred pressure responsive device according to this invention.

With particular reference to Figure 1, a preferred pressure responsive device 10 comprises, according to this invention, a hollow cylindrical load cell housing portion 11, a diaphragm 12, and a beam 13. The diaphragm 12 and beam 13 are integral, that is they are machined from a unitary blank of a resilient material. The material is usually an alloy steel, conventional in the art, but may be chosen from other known resilient materials for special purposes and specific load ranges. As shown, the beam diaphragm combination may also be integral with the load cell housing portion 11. However, the beam-diaphragm combination may be formed separately so long as means clamping the diaphragm 12 about its perimeter and means fixing the ends of the beam are provided.

In addition to providing inherent simplicity of manufacture, the provision of an integral load cell housing portion obviates fluid sealing and hysteresis problems. The portion 11 may be connected to further components of a fluid system by welding, by threaded joints, etc. It will be readily apparent, therefore, that fluid pressures contained within the load cell housing portion 11 are applied as a load over the entire inner surface of diaphragm 12. Deformation of the diaphragm 12 under load results in application of cross-loading forces to beam 13, whereupon beam 13 deflects as a fixed-ended cantilever.

Figure 2:
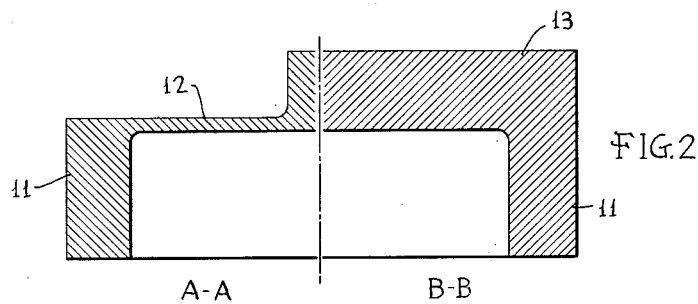
Fig. 2 illustrates cross section elevations of the device of Fig. 1.

Relative proportions of the pressure measuring device of Figure 1 may be more readily understood upon consideration of Figure 2. To the left of the center line is shown the section taken on a diametral plane normal to the beam axis; to the right of the center line the section taken on a diametral plane parallel with the beam axis. The diaphragm 12 is sufficiently thin to be deformed entirely in tension over a design load range. That is, except for loads less than the least load increment to be detected, no significant net compressive stresses are maintained within the material of the free diaphragm portions. By free diaphragm portions is meant the parts of the diaphragm not subtended within the projection of the beam 13 or load cell housing portion 11. Conversely, the section modulus of the beam 13 is chosen sufficiently great for the beam to bend, substantially, as a cantilever fixed at both ends and with a neutral surface passing through the centroid of each lateral cross-section. As a corollary to the above pragmatic definitions, the term beam is limited, substantially, to a parallelepiped having length to lateral dimension ratios greater than five, and diaphragm is limited, substantially, to a strata having diametral to thickness dimension ratios greater than ten.

Figure 3:
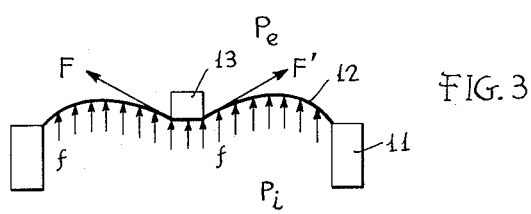
Fig. 3 is a schematic representation useful in explanation of the loading and deflection of the device of Fig. 1.

The line sketch of Figure 3, represents a cross-section of the device of Figure 1 taken on a general plane normal to the beam axis. Assuming the internal fluid pressure $P_i$ to be greater than the external fluid pressure $P_e$ there will be a net incremental force $f$ acting, on each incremental area of the diaphragm, in a direction normal to the incremental area. The diaphragm will deform until equilibrant elastic restoring stresses are set up within the diaphragm-beam system. This equilibrium condition is illustrated in Figure 3. The diaphragm stresses are tangentially directed tensile stresses, represented in summation by forces F and F'. The vertical components of F and F' are additive and serve to load the beam 13. The horizontal components of F and F' are equal and opposite and, therefore, may be neglected. Additionally, the beam is loaded by the net pressure against the area of the diaphragm subtended by the beam. The result is a concentration of loading forces upon the beam, the total beam load being a function of the area of the diaphragm and substantially, independent of the beam dimensions.

The lateral portions of the beam surface are ideally suited for gauged-strain sensing. While any conventional strain gauge may be employed according to conventional techniques, bonded resistance strain gauges are preferred. In Figure 1, a foil type resistance strain gauge 20 is shown bonded centrally of a portion of the external lateral surface of the beam. Leads 21 and 22 may be connected to conventional strain gauge read-out accessories. The gauged-strain, in the example of Figure 1, is a tensile extension of the beam surface (assuming internal pressure to be greater than external pressure). Due to the unique beam-diaphragm configuration, the gauged-strain to deflection ratio at gauging positions may be greatly increased over that achievable with conventional pressure measuring devices. Conversely, the maximum deflection of the beam-diaphragm combination occurs not at the optimum gauged-strain positions but at positions on the diaphragm surface. Hence, distorted relationships between load and strain, which may occur at highly deflected areas of the diaphragm, are not effective at the gauge-strain positions on the beam. Simultaneously, high values of gauged-strain to load ratios are obtainable due to the application of the off-beam diaphragm loads to the beam.

In addition to the optimum gauged-strain properties achievable with the pressure measuring device of this invention, there are attendant and significant manufacturing economies. The primary explanation for the latter is that the least dimension, thickness of the diaphragm, may be assigned relatively large dimensional tolerances. In the past, the major expense of pressure measuring device fabrication has been due to the necessity for machining a thin plate to a uniform thickness. Since in the device of this invention the diaphragm serves for beam loading and not for presentation of gauged-strain areas, diaphragm thickness variations have but small effect upon gauged-strain linearity. Integration over the lateral area of the diaphragm to obtain the load transmitted by the diaphragm cancels out effects of diaphragm thickness variations.

A most important advantage possessed by the pressure measuring device of this invention is its high natural frequency. That is, ambient vibrational disturbances imposed upon such a device in service will not result in anomalous gauged-strain variations. Conventional pressure measuring devices are of necessarily high compliance to achieve high sensitivity and, hence, are characterized by low natural response frequencies. Conversely, compliance of the gauged-strain producing beam in this invention may be decreased to eliminate low natural frequency responses without sacrifice of over-all sensitivity to pressure variations.

While a specific example has been illustrated and described it will be understood that this invention is susceptible to modification in order to adapt it to different usages and conditions and, accordingly, it is desired to comprehend such modifications within this invention as may fall within the scope of the appended claims.

What is claimed is:

1. A differential fluid pressure responsive device comprising a lateral diaphragm, an elongated longitudinal beam formed integrally with said diaphragm with its longitudinal neutral axis parallel with said diaphragm, and rigid supporting means to which the ends of said beam are affixed and to which the periphery of said diaphragm is affixed, whereby a bending load with respect to said axis is transmitted to said beam by said diaphragm in response to differential application of fluid pressures upon opposite surfaces of said diaphragm.

2. The device of claim 1 in which said diaphragm is circular and said beam is longitudinally coextensive with and parallel to a diameter of said diaphragm.

3. A fluid pressure responsive device comprising an integral spring element including a diaphragm applied-load receiving means, a beam gauged-strain producing means oriented symmetrically within the area of the diaphragm, means clamping the diaphragm about its periphery and means fixing the ends of the beam, said diaphragm clamping means and said beam fixing means comprising a hollow cylindrical load cell housing portion formed integrally with said spring element.

4. A fluid pressure measuring device comprising an integral spring element including a diaphragm applied-load receiving means, a beam gauged-strain producing means oriented symmetrically within the area of the diaphragm, a hollow cylindrical load cell housing portion formed integrally with said spring element clamping the diaphragm about its periphery and fixing the ends of the beam, and gauged-strain sensing means bonded to a portion of a beam surface.

5. The pressure load cell of claim 4 wherein said beam includes a surface parallel with said diaphragm and said gauged-strain sensing means is bonded to said parallel surface.

References Cited in the file of this patent

UNITED STATES PATENTS

| | | |
|---|---|---|
| 2,405,199 | Faust | Aug. 6, 1946 |
| 2,550,588 | Oberholtzer | Apr. 24, 1951 |
| 2,611,266 | Wiancko | Sept. 23, 1952 |